Nov. 28, 1967     J. KACHURCHAK     3,355,081

PLASTIC LINER FOR CARDBOARD BOX

Filed April 12, 1966

INVENTOR.
JOSEPH KACHURCHAK
BY Oldham & Oldham
ATTYS.

United States Patent Office 3,355,081
Patented Nov. 28, 1967

3,355,081
PLASTIC LINER FOR CARDBOARD BOX
Joseph Kachurchak, 584 Surfside Drive,
Akron, Ohio 44319
Filed Apr. 12, 1966, Ser. No. 542,098
5 Claims. (Cl. 229—14)

ABSTRACT OF THE DISCLOSURE

A cut resistant liner strip positioned on the inside of a box of paperboard extending around the entire girth thereof. A portion of the strip is bonded to the inside of the top flaps on that side of the fold line and the remaining portion extends in non-adhered fashion over the fold line and a portion of the side panels.

---

This invention relates to a container such as a cardboard box which has secured to the inside thereof at least one resilient plastic liner strip. The plastic strip is secured to the container substantially along the fold line separating the side panels from the end flaps and is adapted to resist cutting so that the ends of the container can be cut off with the plastic liner preventing the cutting blade from damaging any of the goods contained within the container.

It has long been a problem for supermarkets and grocery stores to open cardboard boxes containing food produce without damaging any of the goods contained within the cardboard box. This job is usually assigned to stockboys who slice open the cardboard box containing the food produce with a standard cutting blade or knife. Many times, however, the stockboy will accidentally extend the cutting blade too far through the cardboard box while cutting it open, and the blade will cut through and damage some of the produce contained within the cardboard box.

This problem is especially prevalent where one is attempting to cut open a cardboard box containing cereal foods, cake mixes, etc., since packages of cake mix or cereal foods are packed within the cardboard box in very close, tight-fitting relationship with the packages of produce contained within the cardboard box fitting flush with the walls of the cardboard box. Thus, as the stockboy is cutting off the top portion of the cardboard box, it often happens that some of the individual packages containing the produce are cut and ruined.

This problem has resulted in a great loss for the stores and supermarkets, since it is impossible to sell the goods if their containers have been cut or damaged, for obvious reasons. There have been many attempts to overcome this problem by providing cardboard boxes which can be opened without the use of a cutting blade, but it has been found that these are usually inefficient, ineffective, and the stockboy can perform much more rapidly by simply cutting open the boxes with a knife or a cutting blade and then dispensing the produce contained within onto the shelves of the store or supermarket.

It is the object of the present invention to overcome these, and other prior art problems by placing within a cardboard box a liner strip which is composed of some high strength plastic which resists cutting by a knife. The liner strip is positioned along the inside top edge of the box so that when the stockboy is cutting off the top of the cardboard box containing the food produce, if he accidentally extends the cutting blade too far into the interior of the box while cutting off the top, the blade of the knife will strike the strip of plastic and will be effectively prevented from extending into the box far enough where it might damage some of the packages of produce packed into the cardboard box.

Figure 1:
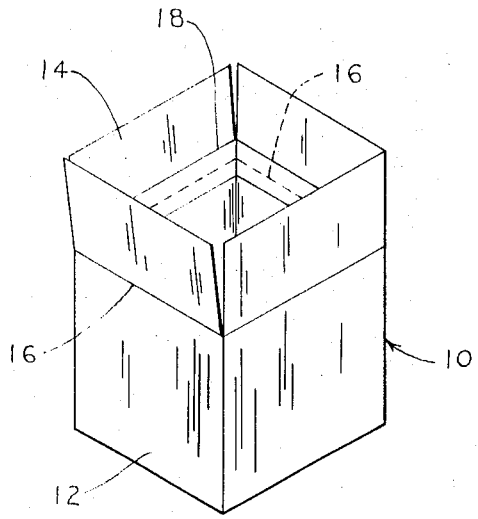
FIG. 1 is a perspective view of a box or container, particularly illustrating the position of the plastic liner strip of the invention.
Figure 3:
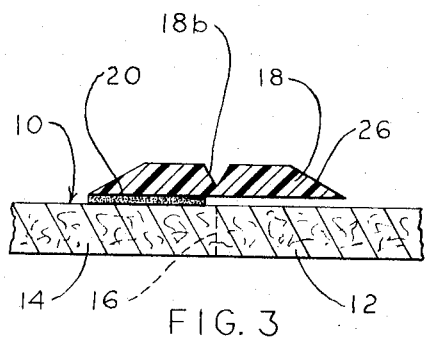
FIG. 3 is a fragmentary, cross sectional view taken substantially along line 3—3 of FIG. 2, with the thickness of the cardboard box and plastic liner strip being greatly exaggerated.

In the drawings, and referring first to FIG. 1, the numeral 10 generally indicates a container or box such as a standard cardboard box. The box 10 is formed from side walls 12 and end flaps 14 which are divided from each other by horizontally extending fold line 16. Positioned on the inside of the box 10, substantially in alignment with fold line 16, is a liner strip 18 made of resilient, high strength plastic such as nylon, polyethylene, polypropylene, or any one of a number of the plastic resins which may be molded or extruded and formed to the desired shape. Preferably, the liner strip 18, as best illustrated by FIG. 3, has the top half portion thereof bonded by a suitable adhesive 20 to the flat top portion 14 of the cardboard box 10. The bottom half portion of the liner strip 18 extends down over the ends of the side panels 12 of the cardboard box 10, but is not adhesively secured thereto. In at least certain instances, if the strip is formed carefully to slightly larger than the desired size it might be merely forced into position and held by friction, rather than by the use of a suitable adhesive.

Figure 2:
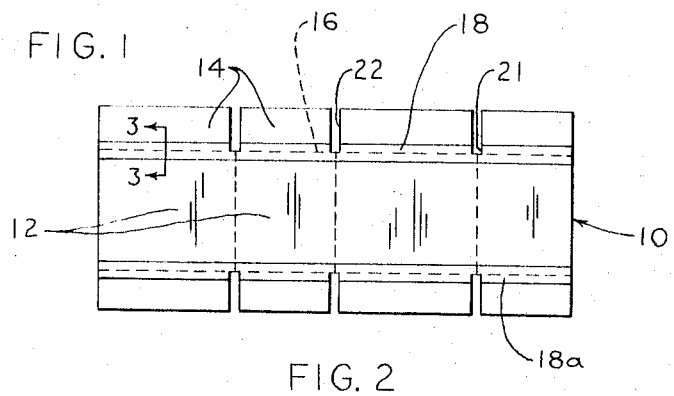
FIG. 2 is a plan view of a container blank utilizing the liner strip of the invention.

FIG. 2 illustrates the cardboard box 10 in blank form and particularly indicates the manner in which the plastic strip 18 is positioned on the inside of the cardboard container 10 in such a manner so that it overlaps the horizontal fold line 16. A plurality of slots 21 are positioned in the plastic liner strip 18, and said slots 21 correspond to flutes 22 positioned in the flaps 14 of the cardboard box 10 to facilitate bending and folding of the box to the desired shape.

Figures 4, 5:
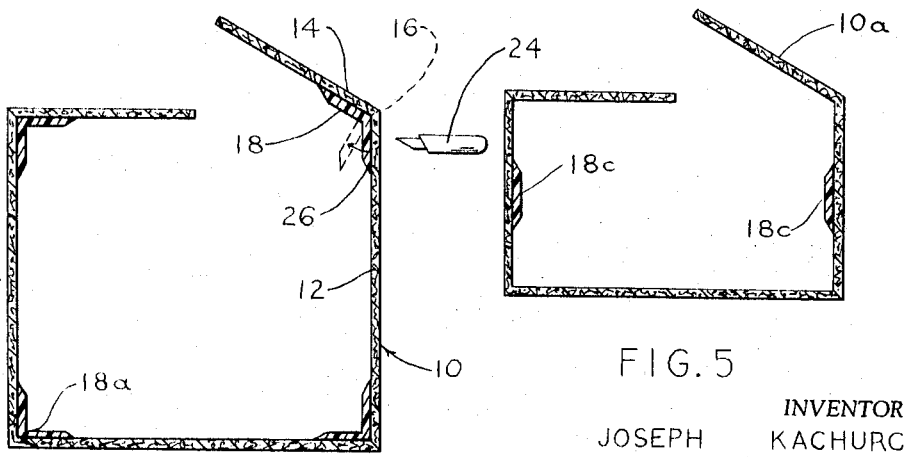
FIG. 4 is a vertical cross sectional view of a cardboard box utilizing the plastic liner strip of the invention.
FIG. 5 is vertical cross sectional view similar to FIG. 4 illustrating a variation of the invention wherein the plastic liner strip is positioned along the inside center portion of a cardboard box.

The purpose of the plastic liner strip 18 is to protect the contents of the cardboard box 10 from being damaged when the closed cardboard box is cut open by a standard knife or cutting tool 24, as seen in FIG. 4. As hereinbefore explained, the cardboard box 10 is usually completely packed with individual packages of produce (not shown) such as cake mixes, cereal foods, etc., with the packages of produce themselves packed in small cardboard boxes and fitting in the cardboard box 10 in close, tight-fitting relationship. As the cardboard box is opened by cutting around the outer periphery of the top of the box 10 just below fold line 16, if the blade of the cutting tool 24 is extended too far through the thickness of the side panel 12, the blade of the cutting tool 24 will strike the bottom half-portion of the plastic strip 18. Since the boxes are tightly packed they will support the bottom half of strip 18 so it will normally not bend inwardly. However, if the packages are loose the strip 18 may bend inwardly slightly until it occupies the position of the dotted lines indicated in FIG. 4. Thus, any packages of produce packed within the cardboard box 10 will be protected from the blade of the knife 24 by the strip 18 no matter how far the blade extends through the side panel 12 of the cardboard box. The plastic strip 18, as mentioned hereinbefore, consists of a high-strength polyethylene or the like, which resists cutting so that a great deal of force can be exerted on the knife 24 without the knife slicing through the thickness of the liner strip 18.

Further, since the strip 18 is normally made flat and adhesively secured only along the top half, when the top flaps are bent down to close the box the non-secured bottom half of the strip is sprung with the resilience of the strip outwardly against the side. This outward springing action helps to defeat the knife from pushing the bottom half out of the way and possibly damaging the packages inside. Of course, it should be understood that the strip 18 need not be formed flat, but could be formed at about a 90° angle to also meet the objects of the invention.

It can be readily understood that the stockboy who is cutting open the cardboard boxes 10 containing the packages of produce, can cut off the top of the cardboard box 10 with knife 24 without having to worry about extending the blade of the knife 24 too far inwardly in the box so that he will damage the food packages packed therein.

The liner strips 18 will generally be formed with feathered ends 26 which enable the packages of produce to be slid into the box and packed therein in very tight relationship to each other and to the side panel 12 of the cardboard box. It should also be noted that an additional plastic liner strip 18a can be positioned at the bottom end of the cardboard box 10 in a manner similar to the liner strip 18 so that the stockboy can cut open the cardboard box even though it is in an upside down position. Suitable notching of the strip 18 as at 18b can be utilized to facilitate the necessary bending thereof.

FIG. 5 illustrates a variation of the invention wherein a plastic liner strip 18c is secured along the inside center portion of a cardboard box 10a. The liner strip 18c is either wedged into position or has a half portion thereof bonded to the cardboard box 10a. In this embodiment longitudinally extending dotted lines (not shown) are added to outside of the cardboard box substantially in alignment with liner strip 18c so that the stockboy can cut open the box around the dotted lines with no danger of extending the cutting blade too far into the box whereby damage is caused to the produce packed therein.

While a certain representative embodiment and details have been shown for the purpose of illustrating the invention, it will be apparent to those skilled in this art that various changes and modifications may be made therein without departing from the spirit or scope of the invention.

What is claimed is:
1. In combination
   a box of paperboard or the like, said box having side panels and top and bottom flaps, with horizontally extending, spaced endless fold lines separating the side panels from the flaps,
   an elongated cut resistant liner strip positioned on the inside of said box of paperboard extending around the entire girth thereof, a portion of said strip being bonded to the inside of the top flaps on that side of the fold line with the remaining portion extending in non-adhered fashion over the fold line and a portion of the side panels, said strip being free to flex inwardly when a cutting instrument is cut through said body of paperboard and is pressed thereagainst to thereby prevent entrance of the cutting instrument into the box.

2. The combination according to claim 1 wherein the edges of said liner strip are feathered, to permit articles to be readily placed in the box of paperboard.

3. The combination according to claim 1 wherein said box of paperboard has corners and flutes therein at the corners to permit folding the top and bottom flaps into position and wherein the liner strip has a plurality of slots positioned therein, said slots corresponding to flutes in the body of paperboard to facilitate positioning the strip in the corners of the box.

4. The combination according to claim 1 wherein said liner strip is positioned on the inside of said box substantially along the inside center portion thereof.

5. The combination according to claim 1 wherein said cut resistant liner strip is made from a high strength, durable thermoplastic resin such as polyethylene, nylon, or polypropylene.

References Cited

UNITED STATES PATENTS 3,090,087   5/1963   Miller _____ 229—49

FOREIGN PATENTS 687,950   6/1964   Canada.

JOSEPH R. LECLAIR, *Primary Examiner.*

R. PESHOCK, *Assistant Examiner.*